N. RÖSHOLT.
LOCKING MECHANISM FOR SWITCH POINTS.
APPLICATION FILED NOV. 22, 1919.
1,327,358.  Patented Jan. 6, 1920.
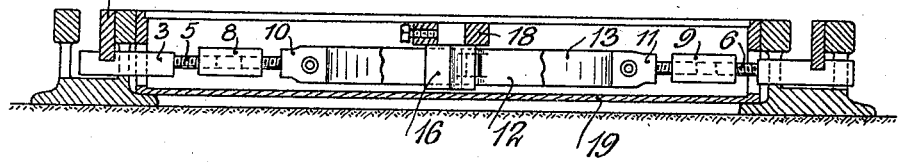
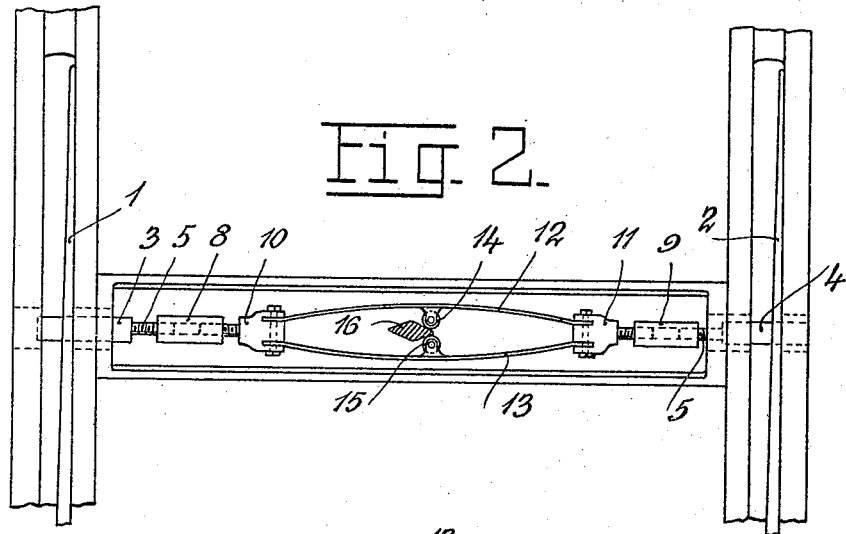
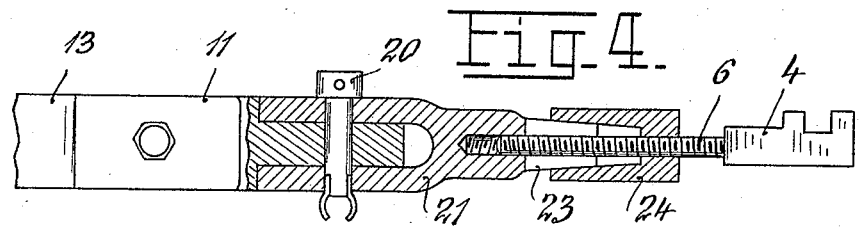
Inventor
Nils Rösholt

UNITED STATES PATENT OFFICE.

NILS RÖSHOLT, OF CHRISTIANIA, NORWAY, ASSIGNOR TO NILS AALL KRAG, OF CHRISTIANIA, NORWAY.

LOCKING MECHANISM FOR SWITCH-POINTS.

1,327,358. Specification of Letters Patent. Patented Jan. 6, 1920.

Application filed November 22, 1919. Serial No. 339,929.

*To all whom it may concern:*

Be it known that I, NILS RÖSHOLT, a subject of the King of Norway, residing at Christiania, Norway, have invented certain new and useful Improvements in Locking Mechanism for Switch-Points; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object a locking device for switch points, particularly adapted for tramways, and the invention mainly consists therein that the member interconnecting the points is provided with a yielding part sliding along a cam surface which is adapted to maintain the yielding member in its extreme positions in such a manner that the points are not liable to be involuntarily shifted.

On the drawing—

Figure 1 is a vertical section and

Fig. 2 is a plan of a form of the invention, while

Fig. 3 is a detail, and

Fig. 4 illustrates a modification.

The two points members 1 and 2 are supported in the ordinary manner in sliding blocks 3 and 4, which are guided in slots in the respective rails. The blocks 3, 4 are connected with screws 5, 6 which in turn are connected by means of threaded sleeves 8, 9 with heads 10, 11. Said heads are connected with each other by means of approximately parallel plate springs 12, 13 each of which is provided at its middle with rollers 14, 15, engaging on opposite sides a stationary cam member 16. Said member 16 is broadest at the middle and slopes toward both sides. When the points are shifted the plate springs will expand at the middle, as the rollers 14, 15 move along the surface 16, and when the switch point members have reached their opposite extreme position, the rollers have reached the opposite narrow end of the member 16. In this position the springs 12, 13 tend to prevent any involuntary shifting of the points.

The member 16 may be mounted on a cross beam 18, and the whole locking mechanism is covered by a casing 19 mounted between the rails.

Fig. 3 indicates the arrangement for a point control mechanism, where the points shall automatically return to the same position. In that case the member 16 has the form of a wedge as indicated on the drawing.

Fig. 4 illustrates a detail of a modification on a larger scale.

According to this modification the head 11 to which the springs 12, 13 are fastened is connected with a member 21, provided with a threaded pore for screws 6.

The member 21 has a conical end and fits into the conical bore of a locking nut 24. The conical end 23 of member 21 may be provided with axial slots in order to secure a firm grip on the screw thread.

Claims:

1. In a locking mechanism for switch points particularly for tramways or the like, the combination with a connecting member between the points, a stationary cam surface and a yielding member fastened on said connecting member engaging said cam surface.

2. In a locking mechanism for switch points particularly for tramways or the like, the combination with a connecting member comprising two parallel plate springs between the points and a stationary cam surface between said plate springs engaging projections thereon so as to prevent involuntary shifting of the points from their extreme positions.

3. In a locking mechanism for switch points, the combination with a member connecting the points of a pair of such, a stationary cam surface tapered down on opposite ends directed toward said points, and resilient means coöperating with said surface to positively actuate said member and points when moved to position, said means past the widest portion of said cam surface.

4. In a locking mechanism for switch points, a sliding block for each switch point, a member between said blocks and adjustably connected thereto and including a yielding element and a stationary cam with which said yielding element coöperates to prevent involuntary shifting of the switch points.

In testimony that I claim the foregoing as my invention, I have signed my name in presence of two subscribing witnesses.

NILS RÖSHOLT.

Witnesses:
A. N. HEDEURCHON,
ROBERT H. FRAZIER.